(12) United States Patent
Hermann et al.

(10) Patent No.: US 8,092,081 B2
(45) Date of Patent: Jan. 10, 2012

(54) BATTERY THERMAL EVENT DETECTION SYSTEM USING AN OPTICAL FIBER

(75) Inventors: Weston Arthur Hermann, Palo Alto, CA (US); Paul Bryan Kreiner, Palo Alto, CA (US); Scott Ira Kohn, Redwood City, CA (US); Dorian West, Menlo Park, CA (US); Jonathan Louis Hall, San Mateo, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 399 days.

(21) Appl. No.: 12/455,173

(22) Filed: May 28, 2009

(65) Prior Publication Data

US 2010/0135355 A1  Jun. 3, 2010

(51) Int. Cl.
*H01M 10/48* (2006.01)
*H02J 7/04* (2006.01)
*G01K 11/32* (2006.01)

(52) U.S. Cl. ........ 374/130; 374/152; 374/141; 374/160; 374/161; 374/E11.015; 320/150; 429/90

(58) Field of Classification Search ...... 374/4, 130–132, 374/141, 152, 161, E11.015; 340/449, 455, 340/636.18; 320/150, 153, 154, 106, 134; 429/62, 90; 324/500, 501

See application file for complete search history.

(56) References Cited

U.S. PATENT DOCUMENTS

| | | | | |
|---|---|---|---|---|
| 5,765,948 | A * | 6/1998 | Sai ............................... | 374/161 |
| 6,079,875 | A * | 6/2000 | Klass et al. ................... | 374/130 |
| 6,811,921 | B2 * | 11/2004 | Dansui et al. ................... | 429/99 |
| 6,903,534 | B2 * | 6/2005 | Minamiura .................... | 320/150 |
| 7,155,075 | B2 * | 12/2006 | Rajendran et al. ............. | 385/12 |
| 7,766,544 | B2 * | 8/2010 | Shibuya et al. ............... | 374/152 |

* cited by examiner

*Primary Examiner* — Amy Cohen Johnson
(74) *Attorney, Agent, or Firm* — Patent Law Office of David G. Beck (57) ABSTRACT

A method and apparatus is provided for determining when a battery, or one or more batteries within a battery pack, undergoes an undesired thermal event such as thermal runaway. The system uses an optical fiber mounted in close proximity to, or in contact with, an external surface of the battery or batteries to be monitored. A source of light is optically coupled to the input facet of the optical fiber and a detector optically coupled to the output facet of the optical fiber. Battery health is determined by monitoring the light transmitted through the optical fiber.

15 Claims, 4 Drawing Sheets

BATTERY THERMAL EVENT DETECTION SYSTEM USING AN OPTICAL FIBER

FIELD OF THE INVENTION

The present invention relates generally to batteries and battery packs and, more particularly, to a system for detecting thermal events in a battery or battery pack.

BACKGROUND OF THE INVENTION

Batteries can be broadly classified into primary and secondary batteries. Primary batteries, also referred to as disposable batteries, are intended to be used until depleted, after which they are simply replaced with one or more new batteries. Secondary batteries, more commonly referred to as rechargeable batteries, are capable of being repeatedly recharged and reused, therefore offering economic, environmental and ease-of-use benefits compared to a disposable battery.

Although rechargeable batteries offer a number of advantages over disposable batteries, this type of battery is not without its drawbacks. In general, most of the disadvantages associated with rechargeable batteries are due to the battery chemistries employed, as these chemistries tend to be less stable than those used in primary cells. Due to these relatively unstable chemistries, secondary cells often require special handling during fabrication. Additionally, secondary cells such as lithium-ion cells tend to be more prone to thermal runaway than primary cells, thermal runaway occurring when the internal reaction rate increases to the point that more heat is being generated than can be withdrawn, leading to a further increase in both reaction rate and heat generation. Eventually the amount of generated heat is great enough to lead to the combustion of the battery as well as materials in proximity to the battery. Thermal runaway may be initiated by a short circuit within the cell, improper cell use, physical abuse, manufacturing defects, or exposure of the cell to extreme external temperatures.

Thermal runaway is of major concern since a single incident can lead to significant property damage and, in some circumstances, bodily harm or loss of life. When a battery undergoes thermal runaway, it typically emits a large quantity of smoke, jets of flaming liquid electrolyte, and sufficient heat to lead to the combustion and destruction of materials in close proximity to the cell. If the cell undergoing thermal runaway is surrounded by one or more additional cells as is typical in a battery pack, then a single thermal runaway event can quickly lead to the thermal runaway of multiple cells which, in turn, can lead to much more extensive collateral damage. Regardless of whether a single cell or multiple cells are undergoing this phenomenon, if the initial fire is not extinguished immediately, subsequent fires may be caused that dramatically expand the degree of property damage. For example, the thermal runaway of a battery within an unattended laptop will likely result in not only the destruction of the laptop, but also at least partial destruction of its surroundings, e.g., home, office, car, laboratory, etc. If the laptop is on-board an aircraft, for example within the cargo hold or a luggage compartment, the ensuing smoke and fire may lead to an emergency landing or, under more dire conditions, a crash landing. Similarly, the thermal runaway of one or more batteries within the battery pack of a hybrid or electric vehicle may destroy not only the car, but may lead to a car wreck if the car is being driven or the destruction of its surroundings if the car is parked.

One approach to overcoming this problem is by reducing the risk of thermal runaway. For example, to prevent batteries from being shorted out during storage and/or handling, precautions can be taken to ensure that batteries are properly stored, for example by insulating the battery terminals and using specifically designed battery storage containers. Another approach to overcoming the thermal runaway problem is to develop new cell chemistries and/or modify existing cell chemistries. For example, research is currently underway to develop composite cathodes that are more tolerant of high charging potentials. Research is also underway to develop electrolyte additives that form more stable passivation layers on the electrodes. Although this research may lead to improved cell chemistries and cell designs, currently this research is only expected to reduce, not eliminate, the possibility of thermal runaway. Accordingly, what is needed is a means for detecting thermal runaway events, and more preferably detecting a precursor to thermal runaway, thereby providing time to eliminate, or at least minimize, damage to adjacent cells and materials. The present invention provides such a means.

SUMMARY OF THE INVENTION

The present invention provides a method and apparatus for determining when a battery, or one or more batteries within a battery pack, undergoes an undesired thermal event such as thermal runaway. The system of the invention uses an optical fiber mounted in close proximity to, or in contact with, an external surface of the battery or batteries to be monitored. A source of light is optically coupled to the input facet of the optical fiber and a detector optically coupled to the output facet of the optical fiber. Battery health is determined by monitoring the light transmitted through the optical fiber.

In at least one embodiment of the invention, a battery thermal event detection system is provided comprised of an optical fiber proximate to an external surface of at least one battery, a light source optically coupled to the input facet of the optical fiber and a detector optically coupled to the output facet of the optical fiber. The system may be used with a single battery or multiple batteries. During a battery thermal event, the light transmitted through the optical fiber may be attenuated across the entire spectrum of the light source, attenuated within a spectral region of the light source, spectrally shifted, or completely interrupted. An optical filter, e.g., a bandpass filter, may be interposed between the optical fiber and the detector, allowing a specific spectral region of transmitted light to be monitored. An optical splitter may be used to split the light exiting the optical fiber into two or more light beams, each light beam then preferably passing through an optical filter before being monitored by a detector. An optical splitter may be used to split the light from the light source, with one light beam used as an input to the optical fiber and the other light beam used to monitor the health and operation of the light source. The optical fiber may be held in place with bonding/potting material, mechanical clips, or other means. The system may include a system controller coupled to the detector, the system controller providing a response when a thermal event is detected. System controller responses may include activating a warning indicator, activating a battery cooling system, activating a fire control system, and transmitting a thermal event notification report.

In at least one embodiment of the invention, a battery thermal event detection system is provided comprised of a plurality of batteries, a first optical fiber proximate to one subset of the batteries and a second optical fiber proximate a second subset of the batteries, a first light source and a first detector coupled to the first optical fiber and a second light source and a second detector coupled to the second optical fiber. The light sources may be multiplexed. The detectors may be multiplexed.

In at least one embodiment of the invention, a method of detecting a battery thermal event is provided, the method comprising the steps of positioning an optical fiber in proximity to the external surface of at least one battery, transmitting light through the optical fiber, detecting the light transmitted through the fiber, and outputting a first signal when the light is transmitted through the optical fiber and a second signal when the light is attenuated as it passes through the optical fiber. The method may further include the step of securing the optical fiber against the external surface of the at least one battery. The method may further include the step of detecting light within a specific spectral region, wherein the attenuation of the light as it passes through the optical fiber during a thermal event is within the specific spectral region.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The term "electric vehicle" as used herein refers to all-electric vehicles, hybrid electric vehicles and plug-in hybrid vehicles. The term "light" as used herein refers to both visible and non-visible light. Lastly, identical element symbols used on multiple figures refer to the same component, or components of equal functionality.

As illustrated and described below, the present invention provides a means of determining whether the monitored temperature of one or more batteries exceeds a predetermined temperature, the predetermined temperature falling outside of a desired and preferred operating range. In accordance with the invention, the predetermined temperature is preferably selected to indicate either that the battery or batteries in question are undergoing thermal runaway, or that they are becoming so hot that thermal runaway is imminent, either of these conditions also being referred to herein as a "thermal event".

Figure 1:
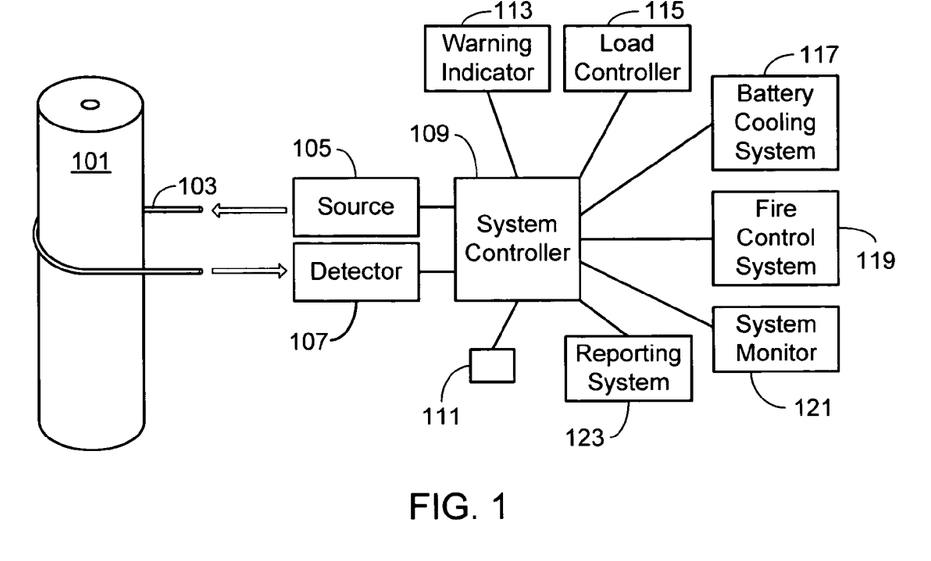
FIG. 1 illustrates a basic embodiment of the invention utilizing an optical fiber in close proximity to, or in contact with, a single battery.
Figure 2:
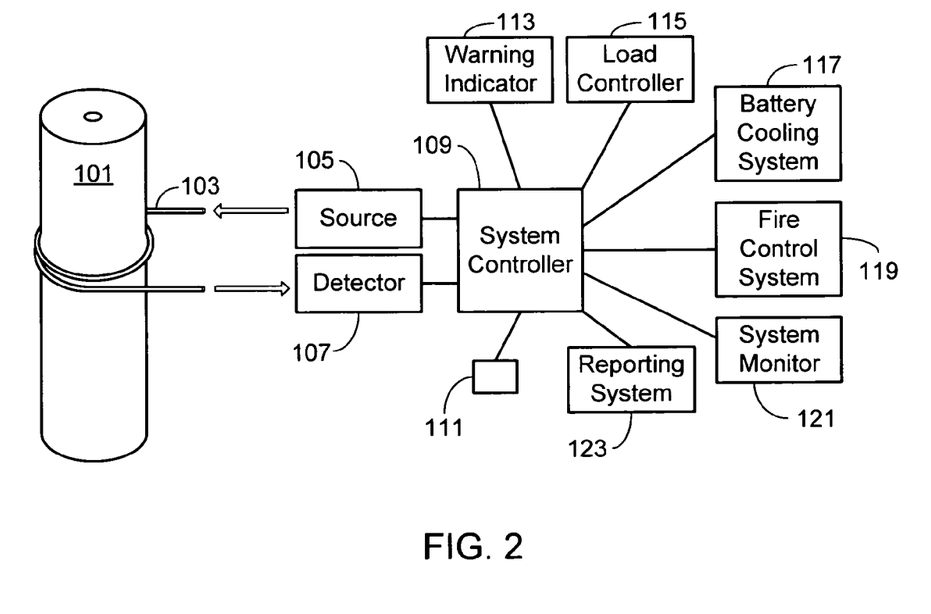
FIG. 2 illustrates an alternate embodiment in which an optical fiber is wrapped around a battery one or more times.

FIG. 1 illustrates the basic inventive concept as well as the simplest embodiment of the invention. In this embodiment, the health of a single battery 101 is monitored although as noted below, the inventors consider the primary application for the invention to be monitoring a plurality of batteries, for example the batteries within a battery pack. The monitoring system consists of an optical fiber 103 in close proximity to, or in contact with, an external surface of battery 101. In at least one preferred embodiment, the external surface of the battery selected to be in contact with, or proximate to, the optical fiber is the venting region of the battery, thus insuring that the optical fiber is exposed to extreme heat during a thermal runaway event. Optical fiber 103 may only be proximate to, or in contact with, a relatively small portion of battery 101 as shown in FIG. 1, or it may be wrapped around battery 101 one or more times as illustrated in FIG. 2. Optically coupled to fiber 103 are a light source 165 and a detector 107. During operation, if battery 101 becomes too hot, for example due to battery shorting or other malfunction, the transmission qualities of fiber 103 are altered, leading to a change in the intensity of the light transmitted through fiber 103 from source 105 to detector 107.

Coupled to detector 107 is a system controller 109. As the output of detector 107 corresponds to the intensity of the light transmitted through fiber 103, by monitoring the output of detector 107, system controller 109 can determine when an excessive cell temperature has been reached. For example, system controller 109 may include a comparator circuit that compares the output of detector 107 with a preset value, the preset value indicative of some nominal fiber transmission level. In this case, a thermal event that has affected the transmission qualities of the fiber is indicated whenever the transmission through fiber 103 falls below the preset nominal transmission level. Alternately, fiber 103 can be treated as a simple on-off switch; transmitting some amount of light from source 105 if the corresponding cell is in good health, and transmitting no light if the cell is experiencing a thermal event that has melted or otherwise substantially affected the transmission qualities of the fiber.

Preferably system controller 109 is also coupled to source 105 as shown. This configuration allows the system to easily accommodate intermittent use, for example testing at a preset frequency (e.g., once every five seconds) instead of continuous monitoring, or only testing under certain circumstances (e.g., when the battery or batteries are under load conditions). In at least one embodiment, system controller 109 is coupled to one or more temperature monitors 111, temperature monitor(s) 111 monitoring ambient battery/battery pack temperature. As the likelihood of a battery undergoing thermal runaway and the risk of such an event spreading to other cells increases with increased ambient temperature, this information can be used, for example, to increase the frequency at which the health of a battery is monitored using the thermal monitoring system of the invention.

Once an excessive rise in temperature has been detected by the system of the invention, system controller 109 can be programmed to perform any of a variety of responses. It will be appreciated that the system can be programmed to perform either single or multiple responses, and in the latter case the responses can be performed serially or in parallel. Although there are any number of possible responses, in general the response is governed by the application in question. For example, a suitable response for the batteries contained in a laptop may be quite different from the response for the batteries in an electric vehicle. Exemplary responses include:

A warning indicator 113 may be coupled to system controller 109 that provides a visual or audible indicator, or both, of a detected battery thermal event. For example, in an electric vehicle, indicator 113 may be an indicator light mounted in an instrument cluster on the dashboard and/or a sound generator coupled to, or separate from, the vehicle's audio system.

System controller 109 may be coupled to means 115 for modifying the load on the battery or batteries. If the thermal event detected by the system is a precursor to thermal runaway, eliminating or at least reducing the load may prevent further increases in battery temperature, thereby possibly preventing battery thermal runaway. Means 115 also helps to achieve a controlled shut-down of the devices/applications powered by the battery or batteries in question. Typically means 115 is a control circuit used to control and couple the power from the battery(s) to the device/application.

An emergency battery cooling system 117 may be coupled to system controller 109, system 117 being activated when a thermal event is detected, thus helping to reduce the temperature of the battery or batteries exhibiting increased temperature. Preferably cooling system 117 is in addition to any cooling system routinely used to control the temperature of the battery(s). Alternately, activation of cooling system 117 may simply increase the cooling capacity of an already operating cooling system. The purpose of cooling system 117 is to try and prevent thermal runaway from occurring if the monitored thermal event is a precursor to thermal runaway, and if thermal runaway is already occurring, prevent its propagation to neighboring cells. Cooling system 117 may be comprised of either a liquid or gas based cooling system.

An emergency fire extinguishing system 119 may be coupled to system controller 109. It will be appreciated that when a battery undergoes thermal runaway, the temperatures are sufficient to cause the combustion of cell materials and/or materials in proximity to the affected cells. Accordingly the purpose of fire extinguishing system 119 is to contain any such fire and prevent it from spreading to adjacent components/materials. Fire extinguishing system 119 may be either liquid or gas based.

In a battery pack containing a large number of cells, the system may be designed to continue operation even after one or more cells have ceased operation due to a thermal runaway event. Accordingly, in at least one embodiment system controller 109 is coupled to an event recording system 121, system 121 preferably recording the time and date of the thermal event. A record of thermal events can later be used to determine potential battery failure mechanisms, for example by noting the demands being placed on the battery-powered device/application at the time of failure or the ambient temperature at the time of failure. Additionally, this information can be used to diagnose other, related issues with the battery-powered device/application. For example, if the malfunctioning battery is part of an electric vehicle's battery pack, a record of this thermal event can be used to diagnose an exhibited loss of vehicle power, charging problems, etc. System 121 may be integrated within system controller 109, or separate from system controller 109, e.g., integrated within a device controller.

In at least one embodiment, system controller 109 is coupled to an on-board communication system 123 that reports thermal events to a user and/or service provider via a communication network such as cellular, internet, satellite or other network (not shown). This system allows the end user to be notified of a problem even if they are not in close proximity to the battery-powered device/application. Alternately, the system can be used to notify a pre-selected service company that a thermal event has been monitored that will require servicing. Alternately, the system can be used to notify an emergency service provider, for example a towing/repair service if the battery-powered device in question is an electric vehicle. Exemplary vehicle communication systems are given in co-pending U.S. patent application Ser. Nos. 11/818,838, filed Jun. 15, 2007 and 11/779,678, filed Jul. 18, 2007, the disclosures of which are incorporated herein for any and all purposes.

A variety of techniques can be used to ensure that the transmission through fiber 103 varies as the temperature of the battery increases, preferably fiber transmission decreasing until it eventually drops below a preset level. In one of the simplest approaches, optical fiber 103 is fabricated from a material with a relatively low melting point. As cell 101 begins to overheat, it eventually reaches a temperature at which fiber 103 begins to melt. Once melting begins, transmission through the fiber rapidly degrades until no light is transmitted through the fiber to detector 107. Accordingly, by monitoring the output of fiber 103 with detector 107 and system controller 109, thermal events are registered when the transmission through the fiber drops below a preset value, or when the fiber simply ceases to transmit the light emitted by source 105.

In general, the composition of fiber 103 is based on its melting point or on some other aspect of the fiber that causes a variation in the fiber's transmission characteristics as a function of temperature. For example, the core and/or cladding may be doped or dyed with a temperature sensitive material. The temperature at which the optical fiber undergoes a detectable, and preferably major, change in transmission characteristics is selected based on the operating and thermal characteristics of the battery to be monitored.

It will be appreciated that there are a variety of optical fiber materials that can be used with the invention. Additionally, as the system can utilize a simple on-off configuration, i.e., the fiber transmits or does not transmit light, relatively low-grade optical fibers can be used, thereby expanding the list of possible fiber materials. Suitable fiber materials include both glasses, e.g., silica-based materials, and a variety of different plastics, e.g., polymethylmethcrylate (PMMA) core with a polymer cladding. Preferably plastic fibers are used due to their low cost, their ability to be subjected to a tight bend radius without exhibiting excessive attenuation, and their tolerance for contamination and scratching.

For some battery chemistries and device applications the temperature at which the fiber undergoes severe optical transmission attenuation may be lower than desired. In such instances if a suitable optical fiber material is not readily available, a thermal insulator can be interposed between the fiber and the battery surface, for example by wrapping the fiber with the thermal insulator. With the proper selection of insulating material and insulating material thickness, the temperature at which the fiber undergoes optical attenuation can be modified.

Figure 3:
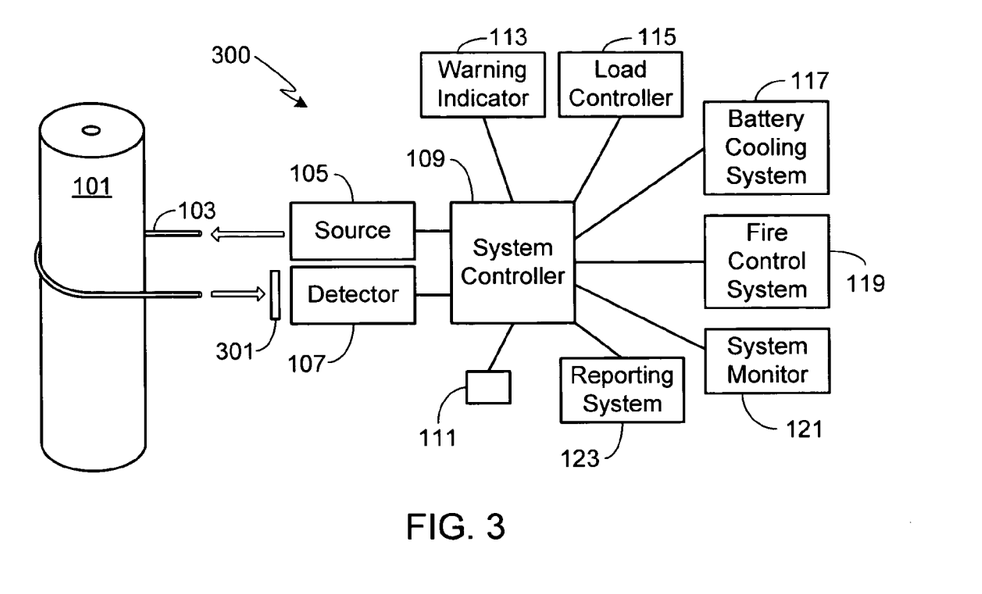
FIG. 3 illustrates an alternate embodiment in which a bandpass filter is interposed between the output of the optical fiber and the detector.
Figure 4:
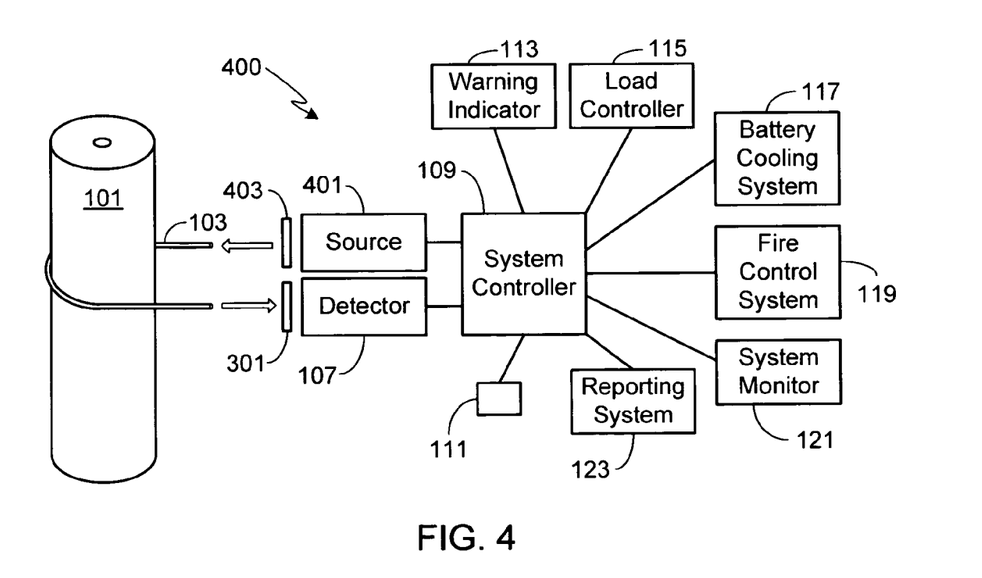
FIG. 4 illustrates an alternate embodiment of the system shown in FIG. 3, this embodiment including a narrow wavelength source and/or an input bandpass filter, thus insuring that only a narrow spectral band is transmitted through the optical fiber.
Figure 5:
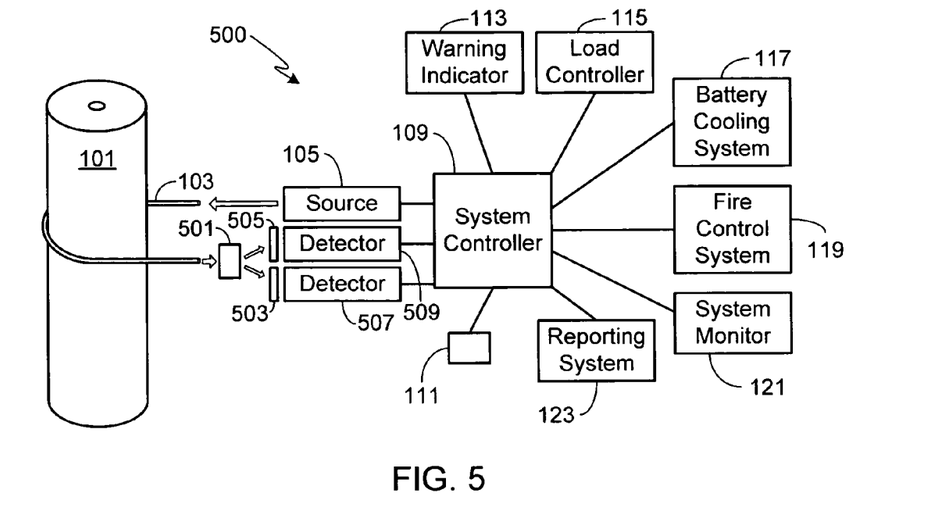
FIG. 5 illustrates an alternate embodiment of the system shown in FIG. 3, this embodiment splitting the output of the optical fiber, thereby allowing different spectral bands to be independently monitored.

As known by those of skill in the art, depending upon core and cladding materials, optical fibers may be designed to exhibit a temperature dependent spectral shift in transmission. FIGS. 3-5 illustrate modifications of the embodiment shown in FIG. 1, each of which take advantage of the temperature dependent spectral shift of such fibers. In system 300 shown in FIG. 3, an optical filter 301, preferably a bandpass filter, is interposed between the output facet of fiber 103 and detector 107. By monitoring the transmission of a relatively small band of wavelengths, the system can be designed to be more sensitive to increasing temperature. Preferably to further increase system sensitivity and as illustrated in FIG. 4, in addition to including bandpass filter 301, the system is configured to transmit only a narrow band of wavelengths through fiber 103. As a result, as the temperature increases during a thermal event, the narrow band of transmitted wavelengths will undergo a shift out of the detection band. This allows the system to provide a very clear indication of an unwanted thermal event without requiring that the temperature increase to the point of fiber melting. To achieve the narrow region of transmitted wavelengths, a source 401 can be used, source 401 emitting a relatively narrow band of wavelengths (e.g., a laser diode). Alternately, a bandpass filter 403 can be interposed between the output of the source and the entrance aperture of fiber 103. Although FIG. 4 illustrates both means 401 and 403, it will be appreciated that typically only a narrow wavelength source 401 or a bandpass filter 403 is required to achieve the desired results.

FIG. 5 illustrates an embodiment based on the embodiment shown in FIG. 3. As shown, in system 500 the output from fiber 103 is split into two or more paths using a splitter 501. Each light path then passes through a bandpass filter, e.g., filters 503/505, before entering a detector, e.g., detectors 507/509. By separating the output from fiber 103 into separate light paths and then monitoring different wavelength bands for each light path, differences in the temperature dependence of different spectral regions can be used to provide additional information about the changing temperature of cell 101. For example, one band may be very sensitive to low temperature increases while the second band may only be sensitive to large temperature increases. In one configuration, one bandpass filter is quite narrow and positioned at a location that provides increased sensitivity to temperature variations, for example positioned on a sloped region of the spectral curve, while the other bandpass filter is quite wide and positioned at a relatively broad and flat portion of the spectral band, thus requiring a greater spectral shift prior to event detection. For an embodiment such as that illustrated in FIG. 5, the first band may be used as an early warning system, potentially allowing battery cooling to be increased or battery load decreased. The second band in such a configuration may be used to detect larger thermal events, such as when one or more batteries undergo thermal runaway, thus requiring a more extreme system response.

Figure 6:
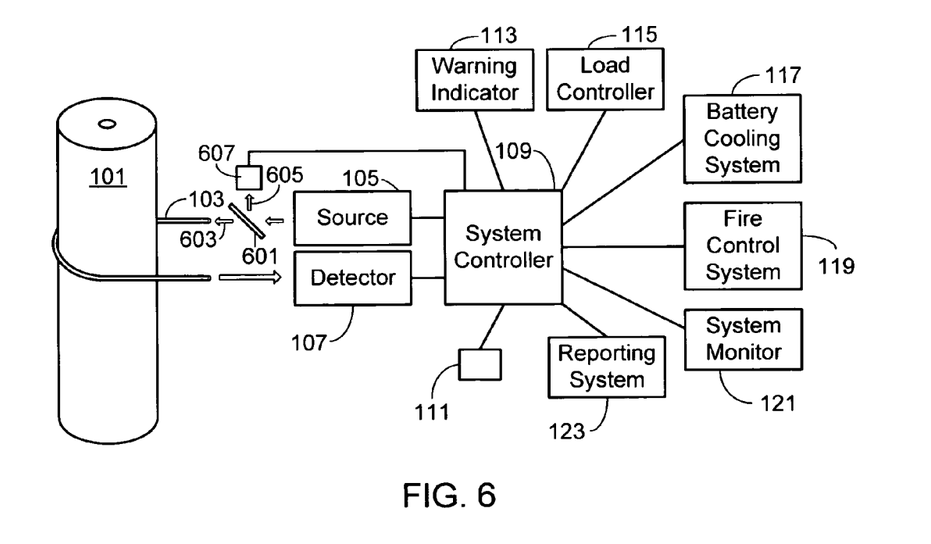
FIG. 6 illustrates an alternate embodiment that includes means for verifying that the source is operating properly.

For some applications of the invention, system controller 109 responds in a predetermined manner even if there is a chance that the monitored thermal event is a false event, for example due to a malfunctioning source 105. In other applications, however, it is desirable to minimize the risk of false event reporting. One approach of minimizing false event reporting is to include redundant systems, thus requiring both systems to detect a thermal event prior to responding. Alternately, and as illustrated in FIG. 6, system controller 109 directly monitors the output from source 105, thus ensuring that if the system detects a thermal event, it is not due to a simple malfunction of the source. In such a configuration, preferably the output from source 105 is split using a beam splitter 601. A portion of the beam, i.e., beam 603, is input into the input facet of optical fiber 103 and used as previously described relative to the embodiments shown in FIGS. 1-5. A second portion of the beam, i.e., beam 605, passes directly into a detector 607, the output of which is coupled to system controller 109. Accordingly, when a thermal event is registered via detector 107, system controller 109 can check that source 105 is functioning properly before responding to the event. It will be appreciated that through the use of simple and well known multiplexing schemes, a single detector can be used to monitor the output of fiber 103 as well as output beam 605 from beam splitter 601.

Like a malfunctioning source 105, a broken optical fiber 103 will also cause the occurrence of a false event. One approach to minimizing the occurrence of such false events is to compare the attenuation profile detected by detector 107 with predetermined profiles kept in memory, this comparison being performed by system controller 109. Thus, for example, for some battery chemistries and configurations, complete and instantaneous attenuation of the source beam may be interpreted as fiber breakage while a more gradual attenuation (e.g., over a period of milliseconds or seconds) may be interpreted as the occurrence of a thermal event.

Figure 7:
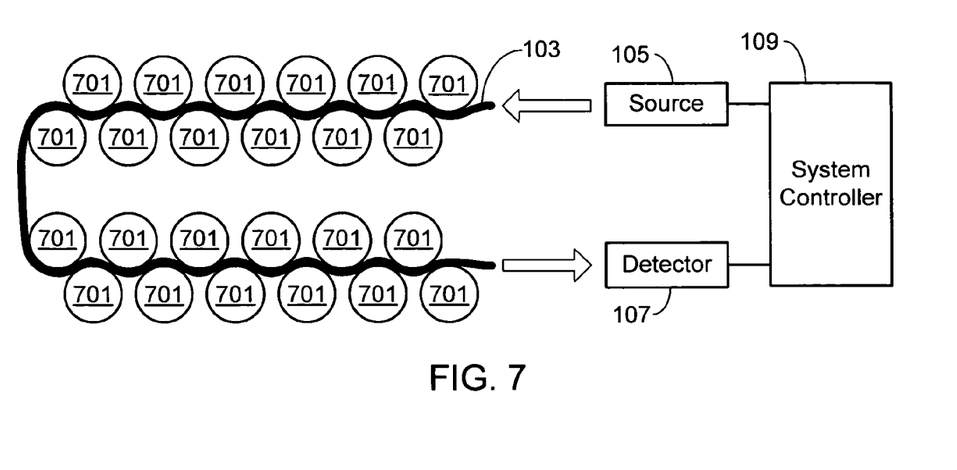
FIG. 7 illustrates an embodiment for use with a plurality of batteries.

As previously noted, although the invention can be used to monitor for thermal events associated with a single battery, preferably it is used to monitor the health of a large number of batteries, for example within a battery pack. FIG. 7 illustrates one such configuration. It should be understood that all of the aspects described above relative to FIGS. 1-6 and single cell monitoring are equally applicable to multi-cell monitoring. Accordingly, each of the previously described embodiments will not be described and illustrated relative to a multi-cell system. Rather, only the differences between single cell and multi-cell systems will be described.

As shown in FIG. 7, fiber 103 passes in close proximity to, or in contact with, a portion of the external surface of a plurality of batteries 701. In this embodiment, when the temperature of any single cell exceeds the thermal event threshold of the system, the change is detected by detector 107 which, in turn, sends a notification signal to system controller 109.

It will be appreciated that any number of different techniques can be used to ensure that fiber 103 is in contact with, or close enough proximity to, the cells. For example, cells 701 may be packed close enough together that fiber 103 is pressed against the external surface of each cell when the fiber is positioned between the cells. Alternately, a potting compound can be used to hold the cells in place as well as the optical fiber relative to the cells. Alternately, a simple clip or other mechanical attachment means can be used to position fiber 103 relative to the cells. Alternately, fiber 103 may be bonded to the cells, for example using a thermally conductive adhesive. Regardless of the technique used to hold the optical fiber against or next to the cells, the technique must continue to function as the temperature of a cell increases, thus insuring that the fiber does not change position as the cell temperature increases which would lead to inaccurate event reporting. Thus, for example, if an adhesive is used, preferably it has a higher melting point than fiber 103 in order to keep fiber 103 positioned as desired.

Figure 8:
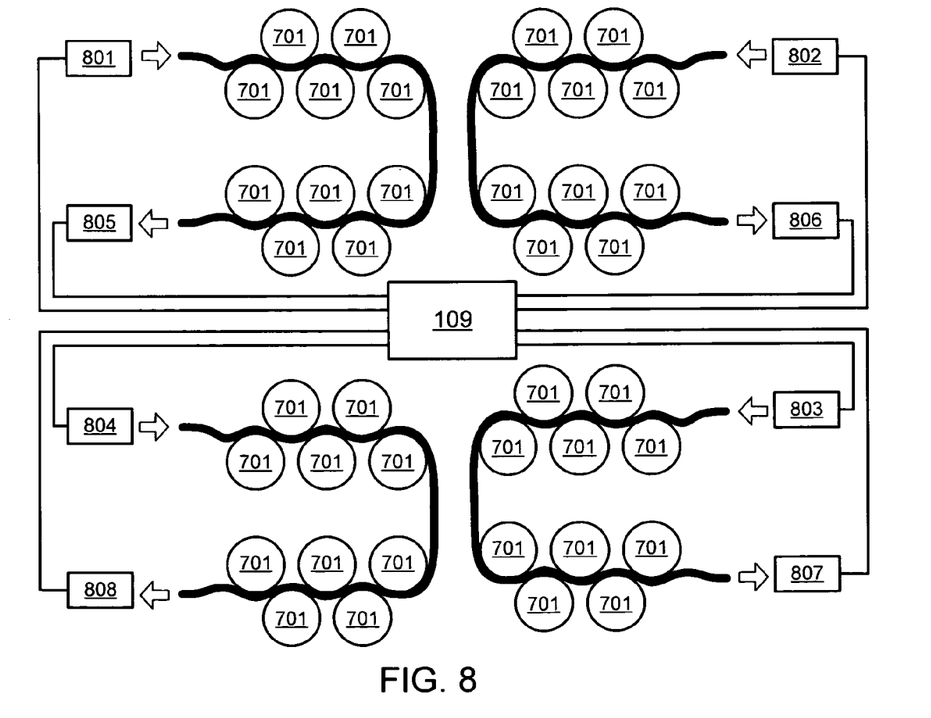
FIG. 8 illustrates an embodiment utilizing multiple thermal sensing systems, each associated with a subset of batteries within a large battery pack.

Although a single optical fiber may be used to monitor the health of some or all of the batteries of a battery pack, in at least one embodiment of the invention the battery pack is divided into multiple groups of cells, each group comprised of a plurality of cells as shown in FIG. 8. In the exemplary embodiment shown in FIG. 8, the battery pack is divided into four battery subsets. It will be appreciated that a battery pack utilizing the invention may be divided into more or less cell groupings, and that each group may contain more or less cells than shown in the exemplary embodiment. In the illustrated embodiment, each cell group has a dedicated source, i.e., sources 801-804, and a dedicated detector, i.e., detectors 805-808. Alternately, any of a variety of well-known multiplexing techniques may be used to reduce the number of sources and/or detectors, for example techniques based on pulse width modulation, wavelength modulation or frequency modulation.

Depending upon the size of the battery pack to be monitored, dividing the pack into multiple cell groups, each of which is individually monitored, offers a number of benefits. First, it allows an affected battery group of the pack to be identified and then decoupled from the battery pack, and thus decoupled from the device and/or application being powered by the battery pack. Decoupling the affected subset of the battery pack, in some configurations, allows the battery-powered device/application to continue to operate, albeit at reduced power. Second, dividing the battery pack into cell subsets allows specific measures to be taken for the affected subset only, measures such as additional cooling and/or deployment of fire retardants, etc. Third, individually monitoring battery subsets simplifies diagnostics and repair, as the affected cells are identified. Fourth, identifying a battery pack subset that is experiencing a thermal event allows measures such as increased cooling to be applied to nearby subsets, thus decreasing the possibility of the thermal event propagating throughout the battery pack.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A detection system for detecting a battery thermal event, the detection system comprising:
   at least one battery;
   an optical fiber proximate to an external surface of said at least one battery, wherein at least a portion of said optical fiber melts when a temperature of said at least one battery exceeds a predetermined temperature, wherein said predetermined temperature is outside of a prescribed battery operating temperature range;
   a light source optically coupled to an input facet of said optical fiber for transmitting light through said optical fiber; and
   a detector optically coupled to an output facet of said optical fiber for detecting light transmitted through said optical fiber, wherein said detector outputs a first signal when said at least one battery is operating within said prescribed temperature range and outputs a second signal when said temperature of said at least one battery exceeds said predetermined temperature causing at least said portion of said optical fiber to melt.

2. The detection system of claim 1, wherein said at least one battery corresponds to one battery of a plurality of batteries and wherein said optical fiber is proximate to each of said plurality of batteries.

3. The detection system of claim 1, further comprising an optical filter interposed between said output facet of said optical fiber and said detector.

4. The detection system of claim 1, further comprising:
   a splitter optically coupled to said output facet of said optical fiber, said splitter splitting light transmitted through said optical fiber into at least a first output beam and a second output beam, wherein said detector is comprised of a first detector for detecting said first output beam and a second detector for detecting said second output beam;
   a first optical filter interposed between said splitter and said first detector; and
   a second optical filter interposed between said splitter and said second detector.

5. The detection system of claim 1, further comprising:
   a splitter interposed between said light source and said input facet of said optical fiber, said splitter splitting light from said light source into at least a first light source beam and a second light source beam, wherein said first light source beam is transmitted through said optical fiber;
   a light source output monitor for detecting said second light source beam, wherein said light source output monitor outputs a light source verification signal when said light source is functioning properly; and
   a system controller coupled to said detector and to said light source output monitor, wherein said system controller outputs a thermal event response control signal when said system controller receives said second signal from said detector and receives said light source verification signal from said light source output monitor.

6. The detection system of claim 1, wherein said optical fiber is in contact with said external surface of said at least one battery.

7. The detection system of claim 1, further comprising a bonding material, said bonding material holding said optical fiber in place relative to said at least one battery.

8. The detection system of claim 1, further comprising a system controller coupled to said detector, wherein said system controller activates a warning indicator when said system controller receives said second signal from said detector.

9. The detection system of claim 1, further comprising a system controller coupled to said detector, wherein said system controller activates a battery cooling system when said system controller receives said second signal from said detector.

10. The detection system of claim 1, further comprising a system controller coupled to said detector, wherein said system controller activates a fire control system when said system controller receives said second signal from said detector.

11. The detection system of claim 1, further comprising a system controller coupled to said detector, and further comprising a communication system coupled to said system controller, wherein said system controller transmits a thermal event notification report via said communication system when said system controller receives said second signal from said detector.

12. The detection system of claim 1, further comprising a thermal insulator interposed between said optical fiber and said external surface of said at least one battery.

13. A detection system for detecting a battery thermal event, the detection system comprising:
   a plurality of batteries;
   a first optical fiber proximate to each battery of a first subset of said plurality of batteries, wherein at least a portion of said first optical fiber melts when a temperature of at least one battery of said first subset of said plurality of batteries exceeds a predetermined temperature, wherein said predetermined temperature is outside of a prescribed battery operating temperature range;
   a second optical fiber proximate to each battery of a second subset of said plurality of batteries, wherein at least a portion of said second optical fiber melts when a temperature of at least one battery of said second subset of said plurality of batteries exceeds said predetermined temperature;

a first light source optically coupled to an input facet of said first optical fiber for transmitting light through said first optical fiber;

a second light source optically coupled to an input facet of said second optical fiber for transmitting light through said second optical fiber;

a first detector optically coupled to an output facet of said first optical fiber for detecting light transmitted through said first optical fiber, wherein said first detector outputs a first thermal event notification signal when said temperature of said at least one battery of said first subset of said plurality of batteries exceeds said predetermined temperature causing said portion of said first optical fiber to melt; and a second detector optically coupled to an output facet of said second optical fiber for detecting light transmitted through said second optical fiber, wherein said second detector outputs a second thermal event notification signal when said temperature of said at least one battery of said second subset of said plurality of batteries exceeds said predetermined temperature causing said portion of said second optical fiber to melt.

14. A method for detecting a battery thermal event, the method comprising the steps of:

positioning an optical fiber in proximity to an external surface of at least one battery, wherein at least a portion of said optical fiber melts when a temperature of said at least one battery exceeds a predetermined temperature, wherein said predetermined temperature is outside of a prescribed battery operating temperature range;

transmitting light through said optical fiber;

detecting said light transmitted through said optical fiber;

outputting a first signal to a system controller when said at least one battery is operating within said prescribed temperature range; and outputting a second signal to said system controller when said temperature of said at least one battery exceeds said predetermined temperature.

15. The method of claim 14, wherein said positioning step further comprises the step of securing said optical fiber against said external surface of said at least one battery.

* * * * *